United States Patent
Chikazawa et al.

(10) Patent No.: US 6,367,372 B1
(45) Date of Patent: Apr. 9, 2002

(54) VALVE OPENING/CLOSING DEVICE OF A FRYER

(75) Inventors: Hideo Chikazawa, Aichi; Tsuneyasu Hayakawa; Hideki Kijimoto, both of Nagoya, all of (JP)

(73) Assignee: Paloma Industries, Limited, Aichi (JP)

( * ) Notice: Subject to any disclaimer, the term of this patent is extended or adjusted under 35 U.S.C. 154(b) by 0 days.

(21) Appl. No.: 09/947,705

(22) Filed: Sep. 6, 2001

(30) Foreign Application Priority Data

Sep. 7, 2000 (JP) .......................................... 12-271660

(51) Int. Cl.⁷ ............................ A47J 37/00; A47J 37/12
(52) U.S. Cl. ............................ 99/403; 99/344; 99/330; 99/337; 126/351.1; 126/391.1
(58) Field of Search .......................... 99/327–330, 331, 99/336, 342–344, 403–410; 126/391.1, 351.1, 350.1; 431/1, 6, 20, 30, 29, 31; 210/167, DIG. 8

(56) References Cited

U.S. PATENT DOCUMENTS

| 4,895,137 A | * | 1/1990 | Jones et al. ............... 126/391.1 |
| 4,945,893 A | * | 8/1990 | Manchester ............... 99/403 X |
| 4,947,824 A | * | 8/1990 | Ejiri et al. ................. 99/403 X |
| 4,949,703 A | * | 8/1990 | Ejiri et al. ....................... 431/1 |
| 5,038,753 A | * | 8/1991 | Yokoyama et al. ....... 99/403 X |
| 5,261,322 A | * | 11/1993 | Yokoyama et al. ........... 99/330 |
| 5,297,474 A | * | 3/1994 | Tabuchi ....................... 99/344 |
| 5,313,876 A | * | 5/1994 | Hilger et al. .................. 99/330 |
| 5,341,728 A | * | 8/1994 | Ejiri et al. ................. 99/344 X |
| 5,417,202 A | * | 5/1995 | Cote ............................ 99/330 |
| 5,544,567 A | * | 8/1996 | Davis et al. .............. 99/344 X |
| 5,680,811 A | * | 10/1997 | Highnote et al. ................. 99/1 |
| 6,101,929 A | * | 8/2000 | Saito ........................... 99/403 |

\* cited by examiner

*Primary Examiner*—Timothy F. Simone
(74) *Attorney, Agent, or Firm*—Pearson & Pearson, LLP

(57) ABSTRACT

The invention provides a valve opening/closing device for a fryer, in which the operation of opening/closing the oil discharge valve is easy, and with which it is possible to recognize with one glance whether it is in an open state or a closed state. In the valve opening/closing device (40), by opening and closing an oil discharge valve (35) placed in an oil discharge pipe (33), which extends from the bottom of an oil vat containing cooking oil, the oil discharge pipe opens and closes. The valve opening/closing device is provided with a long bar-shaped fixed link portion (41), which is fixed at one end to the oil discharge valve and which extends substantially perpendicular to the rotating shaft of the oil discharge valve; a first short bar-shaped rotating link portion (42) fixed at one end to the rotating shaft; a second rotating link portion (43) that is of a similar length to the first rotating link portion and disposed parallel thereto, and that is rotatably attached at one end to the other end of the fixed link portion; a long bar-shaped coupling link portion (44) rotatably fixed at both ends to the other ends of the first and second rotating link portions; and a rotating lever (45) fixed to the other end of the second link portion and extending therefrom.

2 Claims, 6 Drawing Sheets

VALVE OPENING/CLOSING DEVICE OF A FRYER

BACKGROUND OF THE INVENTION

1. Field of the Invention

The present invention relates to a valve opening/closing device of a fryer for opening and closing an oil discharge valve of a ball valve type that is placed in an oil discharge pipe of a fryer for heating cooking oil that has been filled into an oil vat and cooking foods, and that opens and closes that pipe.

2. Description of Related Art

As shown in FIG. 7, conventional fryers of this type are provided with an oil discharge pipe 2 that extends from the bottom of an oil vat 1, which is a box-shaped container opened on the top, and with an oil discharge valve 4 near an oil discharge collection portion 3 at the end of the oil discharge pipe 2, the valve 4 being of a ball valve type that opens and closes the pipe pathway. As shown in FIG. 8 and FIG. 9, the oil discharge valve 4 is provided with the valve opening/closing device 5 being of a simple configuration made up of a rotating link portion 6 of a short length that is fixed to a rotating shaft 4a of the oil discharge valve 4 and that extends in a direction perpendicular to the axis thereof, and an operation link portion 7 that is rotatably attached at one end to the distal end of the rotating link portion 6, that extends toward the front of the fryer and that is guided by a guide portion 8 provided on the housing of the fryer so as to be shifted substantially back and forth (in the direction of the arrow shown in the drawing). The valve opening/closing device 5 can put the oil discharge valve 4 into a closed state by pushing the operation link portion 7 rearward so that the rotating link portion 6 can be put into a position tilted 45° rearward with respect to a sideways orientation, and can put the oil discharge valve 4 into an open state by pulling the operation link portion 7 forward so that the rotating link portion 6 can be put into a position tilted 45° forward with respect to the sideways orientation. It is necessary that the valve opening/closing device 5 is of a simple configuration because many other parts are concentrated on the front side of the fryer.

When cleaning the inside of the oil vat 1, or when the liquid rises to a higher level along with an expansion in volume when solid lard oil, for example, has been given into the oil vat 1 and melted into a liquid state from its original solid state, the oil discharge valve 4 of the above-described valve opening/closing device 5 is opened by operating the operation link portion 7 and the cooking oil in the oil vat 1 is passed through the oil discharge pipe 2 to discharge the oil and is collected within a tank 9 below the fryer.

Structurally, however, in an oil discharge valve of a ball valve type the torque becomes extremely large when starting to open the valve or when the finishing the closing of the valve. That is to say, when opening the valve, the ball is caused to rotate in a state in which air, for example, has been closed in by the through hole piercing the ball, and thus the air acts as a spring, so that it acts as a force that opposes the rotation. Also, when closing the valve, air, for example, is trapped within the through hole and the ball is rotated, and thus in a similar way the air, for example, acts as a spring and as a force in opposition to the rotation of the ball. Thus, with a configuration like that of conventional valve opening/closing devices in which the control link portion is pushed and pulled forward and backward, an extremely large force is required when opening and closing the valve, and for persons with little strength, such as women or elderly people, the opening operation is not easy, nor is it easy when closing the valve to completely close up the oil discharge valve. For that reason, there is the risk that the liquid level within the oil vat decreased due to oil leaking from the oil vat before the operator is aware of it, resulting in poorly cooked foods or accidents such as fire due to overheating the cooking oil. Additionally, because conventional valve opening/closing devices are of the configuration of pushing and pulling the control link portion forward and backward, there is also the problem that it is difficult to clearly judge whether the oil discharge valve is in an open state or a closed state by only looking at the control link portion.

The present invention solves the aforementioned problems, and an object of the present invention is to provide a valve opening/closing device of a fryer, in which it is easy to open and close the oil discharge valve, and in which it is possible to confirm with one glance whether the oil discharge valve is in an open state or a closed state.

SUMMARY OF THE INVENTION

To achieve the above-mentioned object, in accordance with a first aspect of the present invention, a valve opening/closing device of a fryer, wherein an oil discharge valve of a ball valve type is disposed in an oil discharge pipe that extends from a bottom of an oil vat for containing cooking oil and that discharges cooking oil from a discharge opening at its end into a tank, and wherein a pipe pathway through the oil discharge pipe opens and closes by opening and closing of the oil discharge valve, includes a long bar-shaped fixed link portion fixed at one end to the perimeter of a protruding position on a rotating shaft of the oil discharge valve, and extending at substantially right angles to the rotating shaft;

- a first short bar-shaped rotating link portion fixed at one end to the rotating shaft of the oil discharge valve;
- a second rotating link portion that is of a similar length to the first rotating link portion and disposed parallel thereto, and that is rotatably attached at one end to the other end of the fixed link portion;
- a long bar-shaped coupling link portion rotatably fixed at both ends to the other ends of the first and second rotating link portions; and
- a rotating lever fixed to the other end of the second link portion and extending therefrom.

With this configuration according to the first aspect of the invention, when the oil discharge valve is opened for discharging cooking oil from the oil vats, for example to clean the inside of the oil vats, by grabbing the rotating lever and rotating it around the other end of the fixed link portion it is possible to take advantage of the torque corresponding to the length of the second rotating link portion and the rotating lever, thus achieving a large rotating force with little effort. Also, by rotating the first rotating link portion via the coupling link portion coupled to the second rotating link portion, the rotating shaft of the oil discharge valve is rotated, making it possible to easily shift the oil discharge valve into an open state. In the same way it is also possible to easily shift the oil discharge valve into a closed state. Moreover, by looking at the position of the rotating lever corresponding to the open and closed states of the oil discharge valve, for example, by arranging the rotating lever such that it faces sideways or forward, it is possible to confirm with one look whether the oil discharge valve is in an open state or a closed state.

According to a second aspect of the present invention, in a fryer according to the first aspect, the fixed link portion and the coupling link portion are in a bent shape, in which the portions are slightly bent at an intermediate portion in a longitudinal direction while maintaining a parallel state with one another, or the portions are in z-shape, wherein they are slightly bent and bent back. Thus, it is possible to dispose the link portions such that they do not come into contact with the oil discharge collection portion or the oil discharge valve on the oil discharge pipe, or with members at the periphery of the fryer.

DESCRIPTION OF THE PREFERRED EMBODIMENTS

Figure 1:
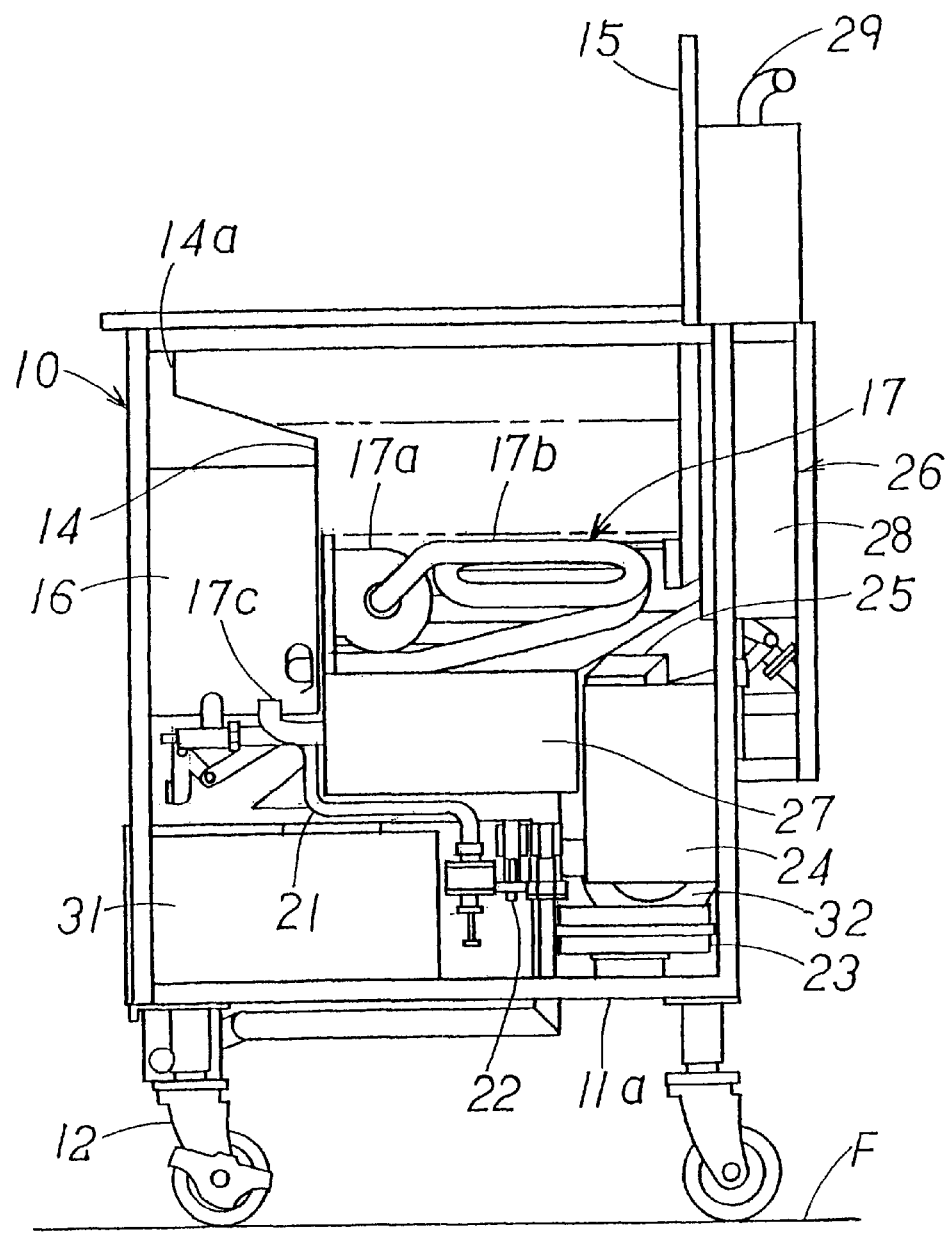
FIG. 1 is a lateral view showing the schematic configuration of one embodiment of the fryer of the present invention.
Figure 2:
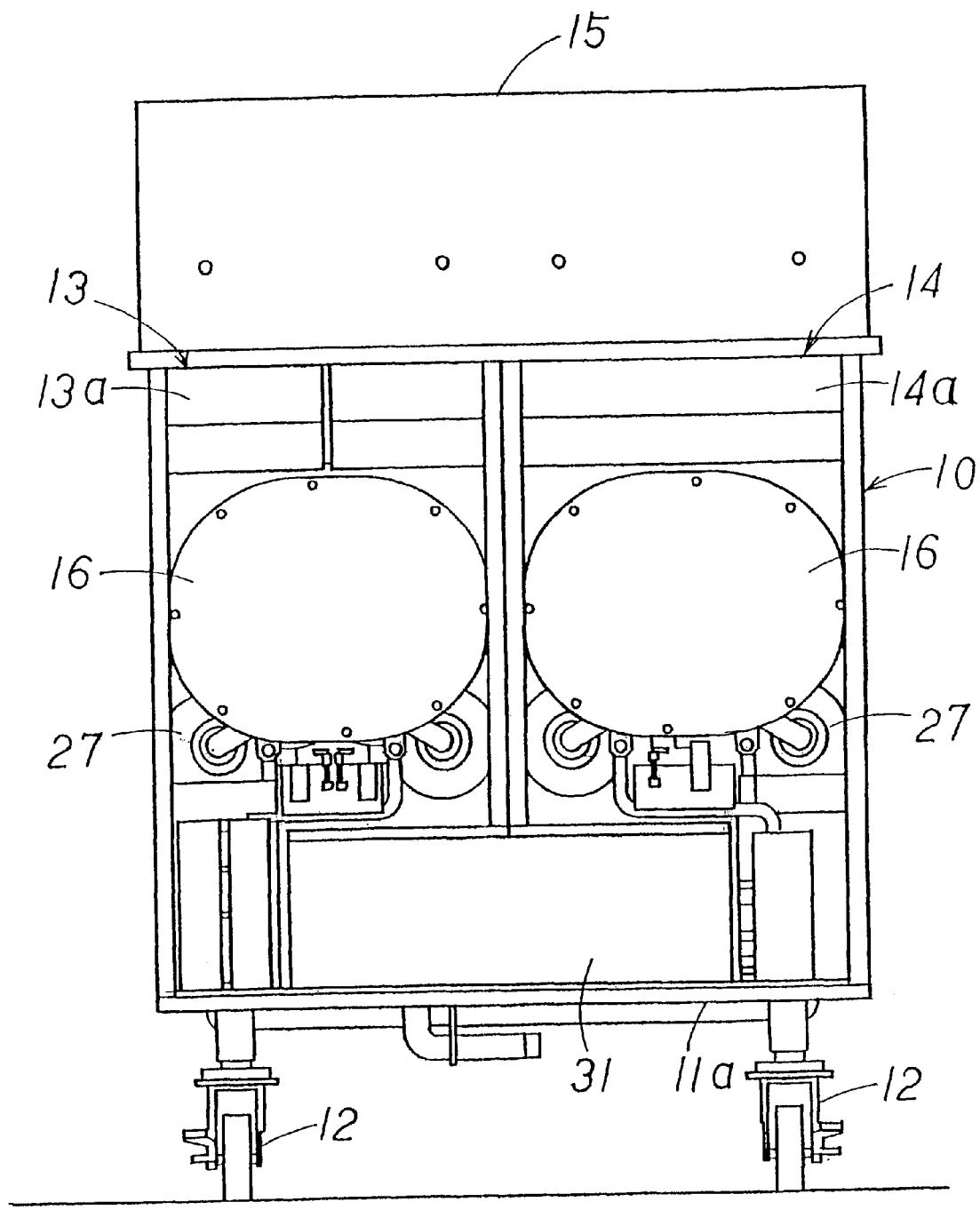
FIG. 2 is a front view showing the schematic configuration of the fryer in FIG. 1.
Figure 3:
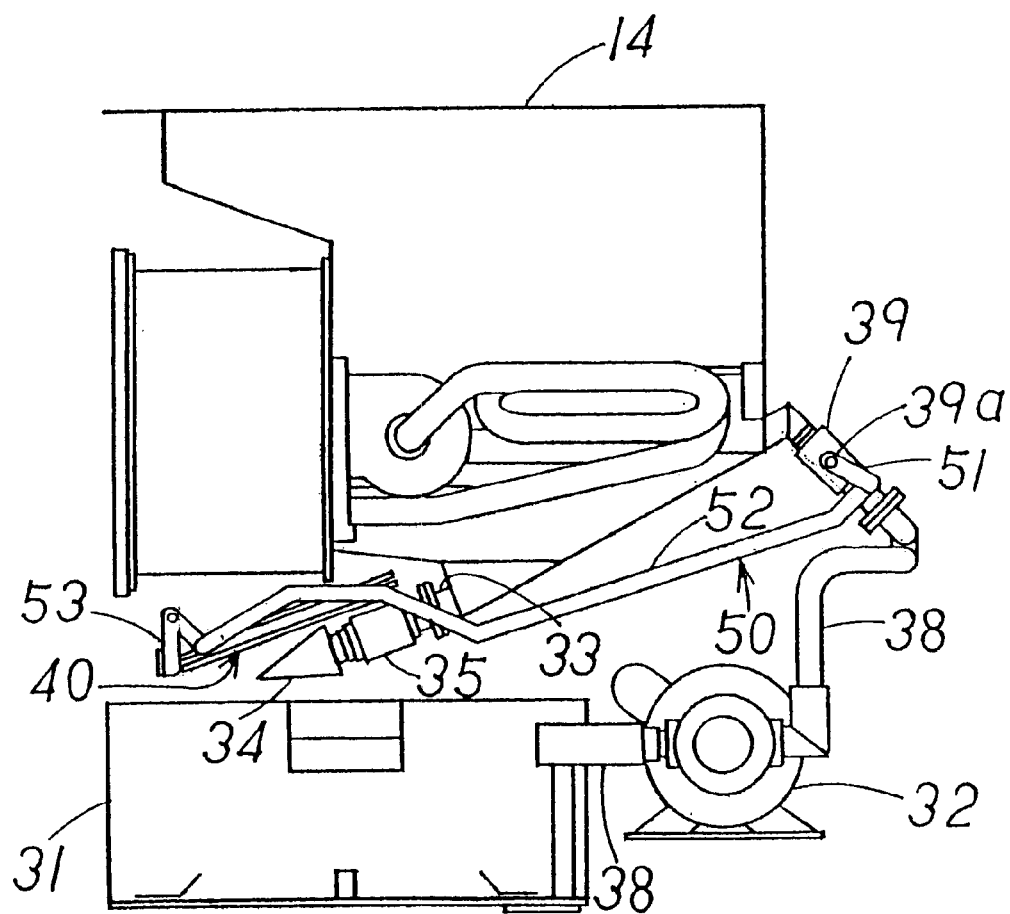
FIG. 3 is a lateral view showing the oil supply and discharge mechanism, which is a primary element of the fryer in FIG. 1.

An embodiment of the present invention is described below with reference to the drawings. FIG. 1 and FIG. 2 show a lateral view (excluding the right side plate) and a front view (excluding the front side plate) of a schematic configuration of a fryer for commercial use according to this embodiment. FIG. 3 shows a lateral view of the supply and discharge mechanism for the cooking oil, which is an essential part of the fryer.

The fryer is provided with a box-shaped housing 10, stands on a floor surface F, supported by casters 12 provided at the four corners of a bottom panel portion 11a of the box-shaped housing 10. The upper portion of the inside of the housing 10 is provided with a pair of left and right oil vats 13 and 14 to hold the cooking oil, with the oil vat 13 on the left side being a split vat divided into two vats, and the oil vat 14 on the right side being a single full vat. The full vat has one of each of an oil supply pipe and an oil discharge pipe, and the split vat has two of each of an oil supply pipe and an oil discharge pipe.

Apron portions 13a and 14a that are frame-shaped and have a front portion that projects forward are integrally attached to the upper edge of the oil vats 13 and 14. A rising panel 15 extending upward is provided on the rear wall side of the apron portions 13a and 14a. A pair of air chambers 16 are attached to the front of the oil vats 13 and 14. Burners 17 (only the one corresponding to the oil vat 14 is shown) for heating the cooking oil within the oil vats is disposed on a side portion of the oil vats 13 and 14. The burner 17 is furnished with a pipe 17b disposed in a looping fashion within the oil vat 14 with one end fixed to the exit of the oil heating chamber 17a and the other end passing through a sidewall of the air chamber 16, and serving as a conduit to the outside. The pipe 17b is in communication with an extension pipe 17c fixed to a sidewall of the air chamber 16.

Each air chamber 16 is connected to a gas supply pipe 21 provided with an electromagnetic valve 22, and also connected, via an air supply pipe 25, with an electrically driven fan 23 and an air supply muffler 24. Additionally, the burners 17 are each provided with a silencing device 26. The silencing devices 26 are provided with a lower exhaust muffler 27 disposed on the lower side of a rear portion of the oil vats 13 and 14, and an upper exhaust muffler 28 disposed on the upper side of a rear portion of the oil vats 13 and 14. The exhaust mufflers are connected in series, and a release pipe 29 that releases exhaust into the air is attached to the upper end of the upper exhaust muffler 28. An oil tank 31 is placed on the bottom panel portion 11a in the housing 10, and an oil pump 32 is provided at the rear portion of the oil tank 31.

As shown in FIG. 3, the discharge and supply mechanism is provided with oil discharge pipes 33 leading out from the oil vats 13 and 14, and an oil discharge collection portion 34 is attached to the end of the oil discharge pipes 33, such that oil is discharged from a discharge opening 34a in the oil discharge collection portion 34 into the oil tank 31 underneath. An oil discharge valve 35 of a ball valve type, for opening and closing a pipe by the rotating position of the ball, is attached adjacent to the oil discharge collection portion 34 of the oil discharge pipe 33. A valve opening/closing device 40 is disposed on the oil discharge valve 35. The following is an explanation of the valve opening/closing device 40 corresponding to the oil vat 14.

Figure 4:
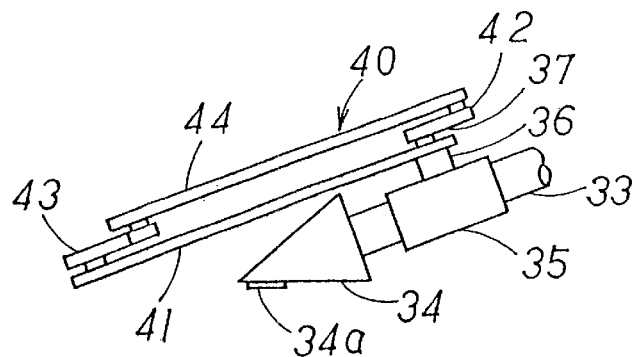
FIG. 4 is a lateral view showing the valve opening/closing device.
Figure 5:
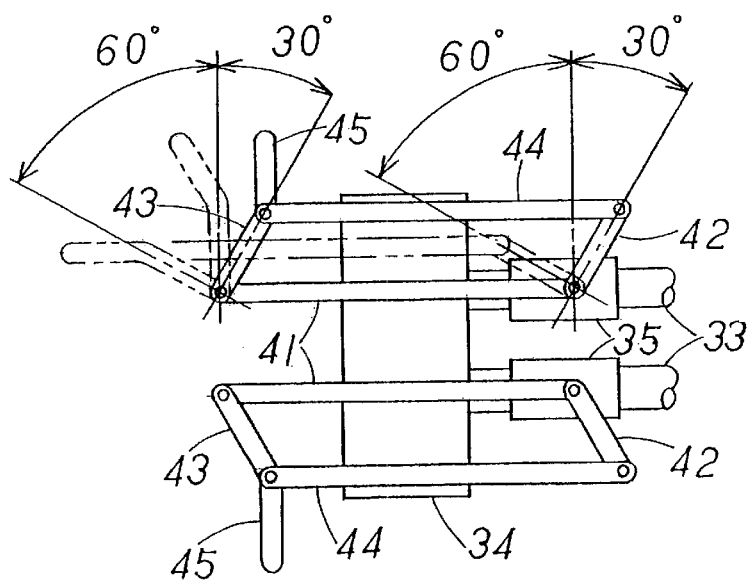
FIG. 5 is a planar view of the valve opening/closing device in FIG. 4.

As shown in FIG. 4 and FIG. 5, the valve opening/closing device 40 is made of a long bar-shaped fixed link portion 41, wherein one end is fixed to a protruding portion 36 of the valve at the protruding position of a rotating shaft 37 of the oil discharge valve 35, and wherein the fixed link portion 41 is substantially perpendicular with respect to the rotating shaft 37 and extends in the direction of the oil discharge collection portion 34; a first short bar-shaped rotating link portion 42 fixed at one end to the rotating shaft 37; a second short bar-shaped rotating link portion 43 of a length substantially equal to that of the first rotating link portion 42, and which at one end is rotatably attached to the other end of the fixed link portion 41; a long bar-shaped coupling link portion 44 of substantially equal length as the fixed link portion 41, wherein both ends are rotatably fixed to the other ends of the first and second rotating link portions 42 and 43; and a rotating lever portion 45 solidly fixed to the other end of the second rotating link portion 43, wherein the rotating lever 45 is disposed on the same surface as the second rotating link portion 43 and extends obliquely at substantially 30° forward with respect to the second rotating link portion 43. When the oil discharge valve 35 is closed, the first and second rotating link portions 42 and 43 are tilted at a 30° angle to the rear with respect to a sideways orientation, and when the oil discharge valve 35 is open, the first and second rotating link portions 42 and 43 are tilted 60° forward with respect to a sideways orientation.

As shown in FIG. 3, an oil supply pipe 38 leads out from the bottom portion of the oil tank 31, and is connected to the oil vats 13 and 14 via the oil pump 32. A ball-valve type oil supply valve 39 is provided in the oil supply pipe 38, downstream from the oil pump 32. The oil supply valve 39 is provided with a valve opening/closing mechanism 50. The valve opening/closing mechanism 50 is provided with a short bar-shaped rotating link portion 51 extending downward and fixed at one end to a rotating shaft 39a of the oil supply valve 39, a long bar-shaped coupling link portion 52 rotatably attached to the other end of the rotating link portion 51, and bent in a plurality of locations and extending out substantially horizontally to the front surface side of the housing 10, and a lever portion 53 in the shape of a V, whose intersection portion is rotatably supported by the housing and wherein one end is rotatably attached to the front end portion of a coupling link portion 52. The oil supply valve 39 can be easily opened and closed by controlling the rotation of the lever portion 53.

In the embodiment with this configuration, when it becomes necessary to open the oil discharge valve 35, for example to clean the inside of the oil vats 13 and 14, the rotating lever 45 extending in a horizontal orientation as seen from the front wall of the housing 10 is gripped and rotated 90° to the front of the fryer on the other end of the fixed link portion 41. This makes it possible to use the torque corresponding to the length of the second rotating link portion 43 and the rotating lever 45, thus achieving a large rotating force with little effort, and makes it easy to put the oil discharge valve 35 in an open state by rotating the first rotating link 42 via the coupling link portion 44 coupled to the second rotating link portion 43 to rotate the rotating shaft 37 of the oil discharge valve 35. Additionally, to close the oil discharge valve 35, the oil discharge valve 35 can be easily put in a closed state in the same way by rotating the rotating lever 45 for 90° in the opposite direction.

The result is that the opening and closing operation of the oil discharge valve 35 can be easily performed even by women or elderly people with little strength. Moreover, the position of the rotating lever 45 corresponding to the open state and closed state of the oil discharge valve 35 is regulated such that they are orientated sideways or frontward when viewed from the front surface, so that by looking at the position of the rotating lever 45 it is possible to tell with one glance whether the oil discharge valve 35 is in an open state or a closed state, and thus is extremely convenient. Consequently, it is possible to prevent oil leaks from the oil vats 13 and 14 caused by leaving the oil discharge valve 35 in a state of incomplete closure. Additionally, it is possible to prevent poor quality of cooked foods resulting from a lowered liquid level when the oil vats are heated, and further prevent accidents such as fires that result from over-heating the cooking oil.

Figure 6:
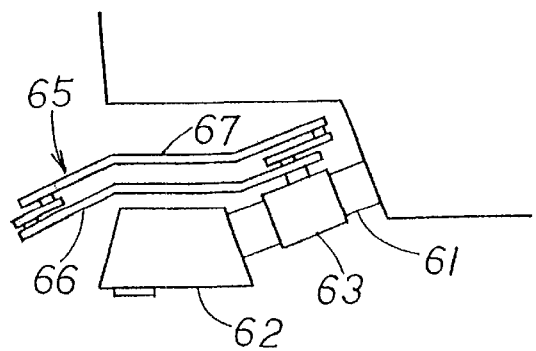
FIG. 6 is a lateral view showing a modification example of the valve opening/closing device.
Figure 7:
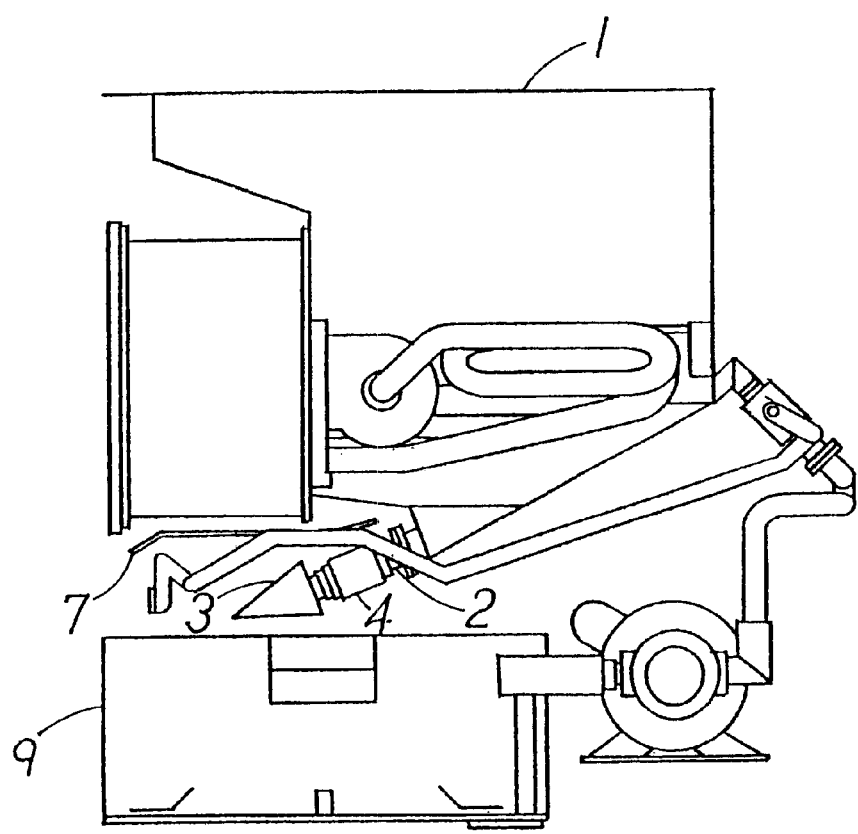
FIG. 7 is a lateral view showing an oil supply and discharge mechanism of a fryer in a conventional example.
Figure 8:
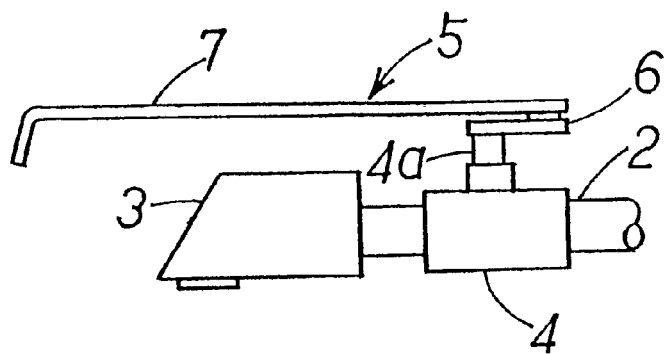
FIG. 8 is a lateral view showing a valve opening/closing device in a conventional example.
Figure 9:
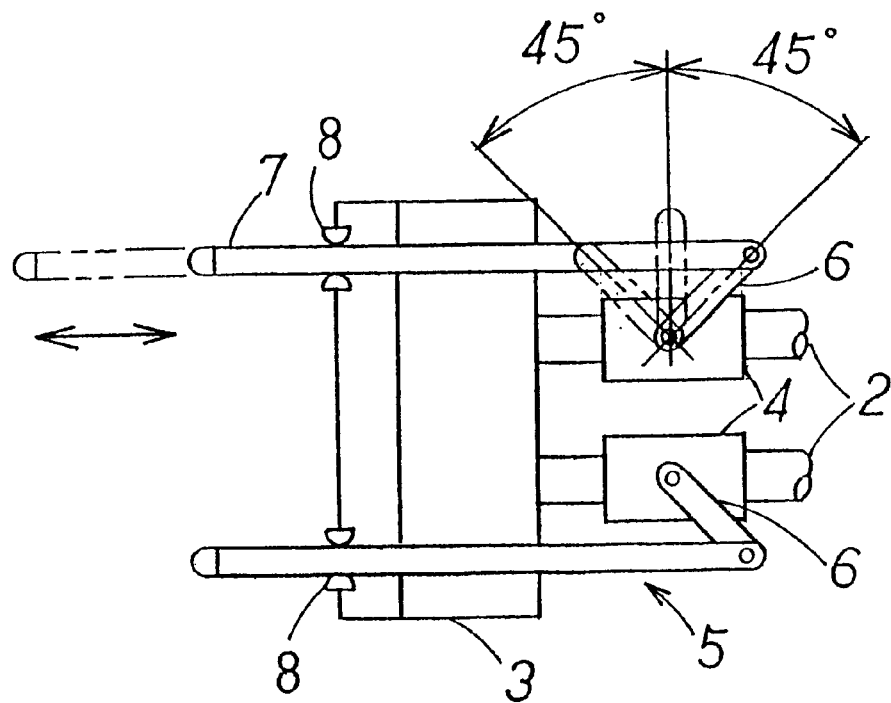
FIG. 9 is a planar view showing a valve opening/closing device in a conventional example.

An example of a modification of the valve opening/closing device is described next. As shown in FIG. 6, in this modified example, when an oil discharge collection portion 62 of a rectangular box-shape is attached in horizontal orientation to an oil discharge pipe 61 extending outward from the oil vat in a tilted direction, a fixed link portion 66 and a coupling link portion 67, both of a valve opening/closing device 65 provided on an oil discharge valve 63, are slightly bent into horizontal orientation at an intermediate portion in a longitudinal direction while maintaining the link portions parallel to one another, and furthermore they are slightly bent back at another intermediate portion in a longitudinal direction, thus attaining a the shape of the letter z. In this way, by modifying the position of the oil discharge valve 63 and the oil discharge collection portion 62 with respect to the oil discharge pipe 61, the fixed link portion 66 and the coupling link portion 67 can be disposed without coming into contact with the oil discharge valve 63 and the oil discharge collection portion 62, making it possible to easily open and close the oil discharge valve 63 with the smooth operation of the link portions.

The fryer and valve opening/closing devices disclosed in the above-mentioned embodiments are only examples, and it is possible to perform a variety of embodiments within a scope that does not deviate from the essential points of the present invention.

According to the first aspect of the invention, when opening or closing the oil discharge valve, by grabbing and rotating the rotating lever of a valve opening/closing device, which is provided with a link mechanism made of a fixed link portion, a first rotating link portion, a second rotating link portion, and a coupling link portion, it is possible to achieve a powerful rotating force with little effort, thus making it possible to easily put the oil discharge valve into the open or closed state. As a result, even persons with little strength, such as women, can easily operate the opening and closing controls. Additionally, by looking at the position of the rotating lever, it is possible to recognize with one glance whether the oil discharge valve is in an open state or a closed state, making it possible to prevent oil leaks from the oil vats that result from leaving the oil discharge valve in an incomplete state of closure. Moreover, it is possible to prevent foods from being cooked poorly resulting from a lowered liquid level during heating of the oil vats, and further prevent accidents that result from overheating of the cooking oil, for example fires.

Additionally, with the fixed link portion and the coupling link portion being formed in a bent shape slightly bent at intermediate portions in a longitudinal direction while maintaining the link portions parallel to one another, it is possible to smoothly carry out the opening and closing operation without having the link portions come into contact with peripheral members, for example when it is necessary to bend and position the oil discharge pipe within a small housing (effect of the second aspect of the invention).

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. A valve opening/closing device of a fryer, wherein an oil discharge valve of a ball valve type is disposed in an oil discharge pipe that extends from a bottom of an oil vat for containing cooking oil and that discharges cooking oil from a discharge opening at its end into a tank, and wherein a pipe pathway through the oil discharge pipe opens and closes by opening and closing of the oil discharge valve, the valve opening/closing device comprising:

a long bar-shaped fixed link portion fixed at one end to the perimeter of a protruding position on a rotating shaft of the oil discharge valve, and extending at substantially right angles to the rotating shaft;

a first short bar-shaped rotating link portion fixed at one end to the rotating shaft of the oil discharge valve;

a second rotating link portion that is of a similar length to the first rotating link portion and disposed parallel thereto, and that is rotatably attached at one end to the other end of the fixed link portion;

a long bar-shaped coupling link portion rotatably fixed at both ends to the other ends of the first and second rotating link portions; and a rotating lever fixed to the other end of the second link portion and extending therefrom.

2. The valve opening/closing device according to claim 1, wherein the fixed link portion and the coupling link portion are in a bent shape, in which the portions are slightly bent at an intermediate portion in a longitudinal direction while maintaining a parallel state with one another, or the portions are in the shape of the letter z, wherein they are slightly bent and bent back.

* * * * *